Patented May 24, 1949

2,471,391

UNITED STATES PATENT OFFICE 2,471,391

PREPARATION OF DIOLS AND ESTER DERIVATIVES THEREOF

Curtis W. Smith, Berkeley, Calif., assignor to Shell Development Company, San Francisco, Calif., a corporation of Delaware No Drawing. Application November 12, 1946, Serial No. 709,086

4 Claims. (Cl. 260—491)

This invention relates to a method of preparing alkanediols and ester derivatives thereof. More particularly, the present invention relates to a method of preparing 1,3-alkanediols and ester derivatives thereof, by a process which comprises effecting reaction between hydrogen and a 1,1,3-triacyloxyalkane in the presence of a suitable hydrogenation catalyst.

It has been discovered that the 1,3-alkanediols or their ester derivatives may be prepared in an improved efficaceous manner by reacting a 1,1,3-triacyloxyalkane with hydrogen in the presence of a suitable hydrogenation catalyst and under effective conditions of temperature of reaction and pressure of hydrogen. The reaction of the 1,1,3-triacyloxyalkane with hydrogen has been found to form directly and in a single step esters of 1,3-alkanediols, according to the equation

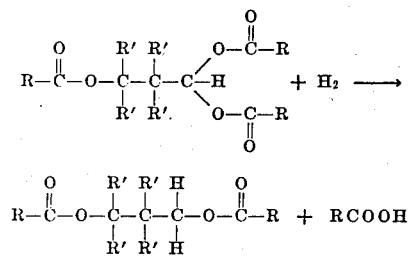

which esters, if desired, then may be hydrolyzed in any known manner to obtain the free glycols of the formula

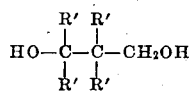

The 1,1,3-triacyloxyalkanes which may be employed in accordance with the present invention comprise those compounds having structures represented by the structural formula

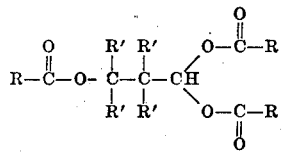

wherein each R represents an organic radical and each R' represents either hydrogen or an organic radical. The organic radicals that may be represented by R and R' may be acyclic or cyclic, saturated or unsaturated, aromatic or nonaromatic, and may be composed solely of carbon and hydrogen atoms or may contain in addition to carbon and hydrogen atoms, atoms of one or more other elements, provided such other atoms are not of a kind or in a position in the molecule to prevent or to hinder undesirably the reaction of the triester with the hydrogen, or to split off, or to affect adversely the activity of the hydrogenation catalyst, or to interfere in any other way with the successful execution of the process. Among the organic groups which thus may be represented by R and R' in the foregoing formula are, for example, alkyl, aryl, cycloalkyl, alkaryl, aralkyl, alkenyl, cycloalkenyl, aralkenyl, alkenaryl, alkynyl, and similar organic groups. Atoms of elements other than hydrogen and carbon which may be present in such organic groups include, for example, oxygen, sulfur, nitrogen, phosphorous, halogen, and the like, as in ethereal oxygen atoms, sulfolanyl groups, amino nitrogen atoms, hydroxylic oxygen atoms, phosphate groups, and the like, or as in heterocyclic radicals as the furfuryl, pyranyl, furyl, pyrryl, and analogous or homologous heterocyclic organic radicals. It has been found to be particularly convenient to employ those compounds wherein R and R' contain, if any, only relatively unreactive carbon-to-carbon bonds, such as saturated carbon-to-carbon bonds or aromatic carbon-to-carbon bonds, and thus preferably represent either hydrogen (in the case of R') or saturated or aromatic organic groups.

When it is desired to utilize the process of the present invention solely for the preparation of glycol esters, the several groups or atoms that will be represented by R and R' will be determined by the particular compound that it is desired to prepare. In such cases, it generally is preferred that the groups represented by R, particularly in the acyloxy groups connected to the same carbon atom, be the same, thereby avoiding, for example, the possibility of competing, alternative reactions which could lead to the formation of a mixture of reaction products less susceptible to separation and/or purification, than otherwise would be obtained. On the other hand, when it is desired to utilize the present process for the preparation of glycols, i. e., when the glycol ester produced by the reaction between the 1,1,3-triacyloxyalkane and hydrogen is desired only as an intermediate, the groups that are represented by R may more generally be the same or different, although for reasons of economy, as will appear hereinafter, it frequently is desirable in this case also, to employ 1,1,3-triacyloxyalkanes in which the three acyloxy groups are the same. The use in the process of 1,1,3-triacyloxyalkanes wherein the three acyloxy groups are not the same has the particular advantage, however, of providing an economical and effective method of preparing a mixed ester of a glycol. As an example of this latter application of the process, a triester of the present class wherein the two acyloxy groups attached to a common carbon atom are the same, but the third acyloxy group differs therefrom, may be reacted with hydrogen to provide a diester of a 1,3-glycol that has different acid residues in the two ester groups and that in many instances could not be readily prepared by the usual, direct methods of esterification.

The triesters, or 1,1,3-triacyloxyalkanes, that are employed in the process of the present invention may be prepared in any suitable manner known to the art. They may be prepared in certain cases, for example, by esterification of the corresponding hydroxyaldehyde by treatment with a suitable esterification agent such as the anhydride of the carboxylic acid corresponding to the desired acyloxy groups. A particularly convenient method of preparation involves treating a diester of an alpha,beta-unsaturated aldehyde or, in other words, a 1,1-diacyloxy-2-alkene, with a carboxylic acid in the presence of an acidic catalyst, to effect direct addition of the carboxylic acid at the alpha,beta carbon-to-carbon multiple bond of the diester, according to the method disclosed in our copending application Serial No. 709,084, filed November 12, 1946. In accordance with the process disclosed in our copending application, a diester of an unsaturated aldehyde, having a structure which may be represented by the formula

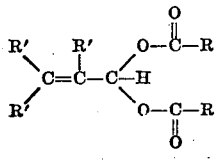

wherein R represents an organic group, is caused to react with a carboxylic acid in the presence of a suitable acidic material serving as a catalyst for the reaction, according to the equation

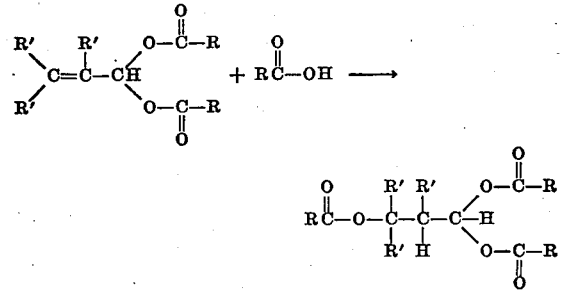

The reaction may be effected by mixing the carboxylic acid and the diester of the unsaturated aldehyde in suitable molar proportions, such as from about 1 to about 3 moles of the carboxylic acid per mole of the diester, and adding to or otherwise contacting the mixture with an acidic catalyst such as a strong mineral acid, sulfuric acid being particularly satisfactory, at a temperature effective for promoting the desired reaction, such as from about 30° C. to about 150° C., preferably from about 30° C. to about 90° C. The process may be executed in either a batchwise manner or in an intermittent or continuous manner. If desired, an inert organic solvent may be included in the reaction mixture, in minor amounts, so as to increase the fluidity of the mixture if necessary or desirable, or so as to render mutually miscible or soluble, reactants that otherwise would be mutually immiscible or insoluble. After completion of the reaction the catalyst may be removed, or neutralized, and the 1,1,3-triacyloxyalkane formed by the reaction recovered from the reaction mixture in any suitable manner, for example, by distillation under reduced pressure.

By virtue of the present process, it becomes possible to prepare 1,3-glycols or ester derivatives thereof from the alpha,beta-unsaturated aldehydes by a method offering several advantages, particularly from the industrial and economic standpoints. A particularly advantageous manner of operation thus comprises reacting an alpha,beta-unsaturated aldehyde with a carboxylic acid anhydride, if desired in the presence of a catalyst such as a suitable acid or acid-reacting material, e. g., sulfuric acid, phosphoric acid, oxalic acid, stannous chloride, zinc chloride, ferric chloride, etc., sulfuric acid being preferred, to form thereby the 1,1-diacyloxy-2-alkene in accordance with the equation.

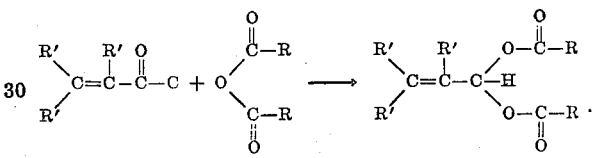

wherein R again represents an organic radical and R' represents one of the class consisting of hydrogen and organic radicals, as in the previous equations. The reaction may be effected, for example, in the presence of the acid or acid-reacting material present in catalytic amounts such as from about 0.1% to about 5% by weight of the reactants, at a temperature between about 0° C. and about 20° C. or higher, and in the presence of a suitable inert organic solvent if desired. At the same time or thereafter, the 1,1-diacyloxy-2-alkene thus formed may be reacted with a carboxylic acid to form a 1,1,3-triacyloxyalkane in the manner described above. The 1,1,3-triacyloxyalkane, in turn, then may be reacted with hydrogen according to the method described herein to provide by such reaction the desired diester of a 1,3-alkanediol. It will be noted that when proceeding in this manner, each of the reactions except the last, involves only addition of molecules, the desired compound being the only product of the reaction by which it is formed. The formation of by-products of reaction thus desirably is minimized and the ease of operation in actual practice is desirably increased. Further economies result from the fact that the carboxylic acid formed, or liberated, during the present reaction between the 1,1,3-triacyloxyalkane and hydrogen may be neutilized in the overall process with a consequent advantage in the economy of materials required.

Among the unsaturated aldehydes which thus may be utilized for the preparation of 1,3-glycols or ester derivatives thereof are, for example, acrolein to obtain 1,3-propanediol or its esters, methacrolein to obtain 2-methyl-1,3-propanediol or its esters, crotonaldehyde to obtain 1,3-butanediol or its esters, alpha-ethylacrolein to obtain 2-ethyl-1,3-propanediol or its esters, alpha-phenylacrolein to obtain 2-phenyl-1,3-propanediol or its esters, beta-cyclohexylcrotonaldehyde to obtain 3-cyclohexyl-1,3-butanediol or its esters, alpha,beta-diethylacrolein to obtain 2-ethyl-1,3-pentanediol or its esters, and analogous and homologous alpha,beta-unsaturated aldehydes to obtain the corresponding analogous and homologous 1,3-alkanediols.

When it is desired ultimately to obtain the free diols, or when the particular identity of the ester derivatives thereof is not a factor for consideration, it generally is most convenient and economical to prepare the respective acetoxy derivatives as by reaction of the selected alpha,beta-unsaturated aldehyde with acetic anhydride to obtain the 1,1-diacetoxy-2-alkene, and addition thereto of acetic acid to form the desired 1,1,3-triacetoxyalkane. Other carboxylic acids and carboxylic acid anhydrides that may be employed to prepare in this manner 1,1,3-triacyloxyalkanes suitable for use in the present process include, for example, propionic acid and its anhydride, butyric acid and its anhydride, benzoic acid and its anhydride, and the like. One carboxylic acid, and the anhydride of a different carboxylic acid may be employed, if desired.

The reaction between the 1,1,3-triacyloxyalkane and the hydrogen is effected in accordance with the present invention in the presence of a suitable hydrogenation catalyst, and at a temperature of reaction, pressure of hydrogen, and for a reaction time which serve to provide the desired reaction without promoting excessive undesired side reactions. The particular catalyst which may be employed most advantageously in the process depends upon the activity of the catylst, the particular 1,1,3-triacyloxyalkane that is to be employed, upon the stability of the catalyst under the conditions employed, upon the specific nature of the products formed by the reaction and any possible effects they may have on the catalyst or it on them, and upon similar considerations.

Those catalysts which may be employed effectively in the present process comprise the metals or compounds of metals that are catalytically effective in promoting the hydrogenation of organic substances and that are known as and generally referred to by the art as "hydrogenation catalysts." Catalytically active metals, or compounds of metals, particularly the oxides or sulfides of metals, such as nickel, tungsten, molybdenum, cerium, thorium, chromium, zirconium, or the like, or mixtures of two or more oxides and/or two or more sulfides and/or metals, may be employed. There also may be employed as the hydrogenation catalyst, catalysts comprising a mixture of two or more metals, as in mixtures or in alloys such as of copper and silver, copper and chromium, copper and zinc, nickel and zinc, and similar combinations.

It generally is preferable to employ and effective catalyst that is relatively inexpensive and that is relatively easy to prepare and to regenerate or to reactivate. The base metal catalysts, consisting of or comprising a base metal such as chromium, thallium, nickel, iron or cobalt thus may be employed, with the metal present either in a finely divided state and suspended in the 1,1,3-triacyloxyalkane, or deposited on an inert or catalytically active supporting material such as pumice, charcoal, silica gel, kieselguhr, or the like. Pyrophoric nickel, iron, and cobalt may be employed with advantage in the process of the present invention because they possess an initial activity providing rapid reaction at conditions readily obtainable in practice, and because they may be easily prepared and regenerated or reactivated. These and similar catalysts may be used singly or in combination, and may be used either alone or supported on suitable catalytically active or inert supports, such as pumice, charcoal, silica gel, kieselguhr, etc. The activity of the catalyst may be enhanced by the incorporation of promoters, which include such substances as high-melting and difficultly reducible oxygen-containing compounds, in particular, the oxides and oxygen-containing salts of elements such as of the alkaline earth and the rare earth metals, beryllium, magnesium, aluminum, copper, thorium, manganese, vanadium, chromium, boron, zinc, etc. A particularly suitable group of promoters includes the difficultly soluble phosphates, molybdates, tungstates and selenates of the above-listed metals, or their oxygen-containing reduction products, as, for example, the corresponding selenites.

Particularly favorable results have been obtained by the use in the present process of the active nickel catalyst known to the art as Raney nickel catalyst and prepared by digesting a nickel-aluminum alloy in caustic alkali solution to dissolve the aluminum and to leave a residue of finely divided, highly active nickel metal. See, for example, U. S. Patent No. 1,628,190, to Raney.

Other catalysts which may be employed in executing the process of the present invention include the catalytically active noble metals which have the requisite activity and selected from the group comprising gold, silver, platinum, palladium, osmium, rhodium, iridium, and the like.

The reaction between the 1,1,3-triacyloxyalkane and the hydrogen may be effected by contacting the triester, generally in the liquid state, with the catalyst in the presence of hydrogen gas, under conditions of temperature, pressure of hydrogen, and time, adapted to bring about the desired reaction. The catalyst, if finely divided, thus may be suspended in the 1,1,3-triacyloxyalkane, and the mixture exposed to the action of hydrogen gas at elevated temperatures and under superatmospheric pressures of hydrogen. Alternatively, a stream of the 1,1,3-triacyloxyalkane may be contacted with a suitable catalyst in a more massive state, or supported on a suitable supporting material, and positioned in a reaction vessel or reaction tube, in the presence of hydrogen gas under superatmospheric pressure and at an elevated temperature.

The amount of the catalyst to be employed in any given case depends upon the activity of the particular catalyst under consideration, the identity of the triester to be reacted with the hydrogen, and upon the other conditions of reaction. When employing Raney nickel as the catalyst, amounts of catalyst between about 2 and about 20 per cent by weight of the 1,1,3-triacyloxyalkane have been employed with highly satisfactory results. However, these proportions are not highly critical, and it may be found to be desirable to employ either more or less catalyst, depending upon the particular circumstances under which the reaction is effected.

The 1,1,3-triacyloxyalkane while in contact with the catalyst, as in a mixture comprising finely divided catalyst and the triester, may be subjected to the action of hydrogen gas in any suitable apparatus and in either batchwise, intermittent, or continuous manner. The 1,1,3-triacyloxyalkane while in contact with the catalyst thus may be exposed to the action of an atmosphere of hydrogen gas, or hydrogen gas may be passed through the 1,1,3-triacyloxyalkane in the liquid state, in either case under conditions of temperature and pressure adapted to promote and to maintain the desired reaction between the hydrogen and the triester. The temperatures and pressures best adapted to provide optimum results in any given case depend upon the activity of the particular catalyst, the identity of the 1,1,3-triacyloxyalkane involved, and the like. It is preferred to employ temperatures above ordinary room temperature but below the temperature at which substantial decomposition either of reactant or of reaction product may occur. Temperatures between about 50° C. and about 350° C. thus may be employed, although it generally is most convenient and advantageous to employ temperatures between about 75° C. and about 200° C. Hydrogen pressures between about 500 pounds per square inch and about 5000 pounds per square inch are suitable. However, the desired reaction generally may be obtained with hydrogen pressures between about 500 pounds per square inch and about 2500 pounds per square inch, with the advantage of avoiding the requirements that otherwise might be imposed in the way of equipment suited to withstand the more elevated pressures.

When the reaction is effected at the elevated hydrogen pressures referred to above, the 1,1,3-triacyloxyalkane is maintained in the liquid state. The reaction may at times be effected with the organic reactant in the vapor phase, as by the use of lower hydrogen pressures, down to subatmospheric pressures, and temperatures above that of the boiling point of the organic reactant at the pressure employed. Such conditions, however, may entail the use of highly active catalysts and maintenance of the catalyst activity as by frequent replacement or otherwise. Under the aforementioned, preferred, conditions of elevated pressure and with the organic reactant in the liquid state, less rigorous requirements upon catalyst activity are imposed, with consequent advantages in ease of operation and the like.

It has been found that under the aforementioned conditions of elevated temperature and pressure, the reaction may be allowed to continue until the reaction between the triester and the hydrogen is complete as judged by the amount of hydrogen absorbed. For example, satisfactory yields of glycol diesters thus have been obtained with Raney nickel catalyst in reaction times of from about 1 to about 6 hours, although in any given case longer or shorter times may be employed if desirable.

The process of the present invention is not limited as to the type of apparatus. The selection of suitable equipment can be made readily by those skilled in the art. It is desirable to provide agitation during the course of the reaction to provide intimate contact between the catalyst and reactants. For batchwise operations, any suitable reaction vessel such as one constructed of or lined with stainless steel or other materials non-reactive with the reaction mixture, and capable of withstanding any elevated pressures that are involved, may be employed. The process may be effected continuously, as by passing the triester over a bed of the catalyst, either concurrent with or countercurrent to a stream of hydrogen gas, or by passing the hydrogen and a mixture of the organic reactant and finely-divided catalyst through a reaction tube at effective temperatures and pressures, or otherwise.

The following examples will illustrate the application of the process of the invention to the preparation of acylic 1,3-alkanediols from 1,1,3- triacyloxyalkanes which are acyclic and which contain only saturated carbon-to-carbon bonds. The examples thus illustrate a preferred embodiment of the process of the invention, exemplified by the preparation of aliphatic saturated glycols or esters thereof. It will be appreciated, however, that the examples are not presented with the intent to limit unnecessarily in any way the scope of the invention, which is defined in its more general aspects by the appended claims with reference to the more general, preceding description of the invention.

Example I

A stainless steel reaction vessel of a customary design suitable for use in hydrogenation processes, and provided with a stirrer, with inlets and outlets for hydrogen, and with internally located heating coils, was partially filled with liquid 1,1,3-triacetoxypropane. Finely-divided Raney nickel catalyst was added in an amount corresponding to 8 per cent by weight of the 1,1,3-triacetoxypropane. After the residual air had been swept out of the vessel, hydrogen gas was introduced into the vessel and maintained therein under a pressure of 1000 pounds per square inch while the contents of the vessel were maintained, with agitation, at about 100° C. After 90 minutes, the hydrogen pressure was increased to 1500 pounds per square inch and the temperature was raised to 150° C. for an additional 3 hours. At the end of this time, slightly more than the theoretical amount of hydrogen had been absorbed. The hydrogenation mixture thereupon was filtered to remove the catalyst, and distilled under reduced pressure. The diacetate of 1,3-propanediol, distilling at 84° to 84.5° C. under a pressure of 10 millimeters of mercury, was recovered in a yield of 55 per cent.

Example II

Acrolein and acetic anhydride present in equimolar quantities were reacted in the presence of about 0.1 per cent by weight of sulfuric acid by maintaining a mixture thereof at about 40° C. for about 4 hours. Glacial acetic acid then was added to the mixture in an amount corresponding to 2½ parts of acetic acid per part of the mixture, and the reaction mixture was allowed to stand for 18 hours at 50° C. Sufficient sodium acetate was added to the reaction mixture to neutralize the sulfuric acid and the resultant mixture was fractionally distilled under reduced pressure, 1,1,3-triacetoxypropane being separated as the fraction distilling at 90° to 98° C. and 0.6 millimeter of mercury.

The 1,1,3-triacetoxypropane that was thus obtained was reacted with hydrogen in the presence of 10 per cent by weight of Raney nickel catalyst and at 150° C. by treatment with hydrogen gas under a pressure of 1500 pounds per square inch until an amount of hydrogen equal to the theoretical requirement had been absorbed. The catalyst was removed by filtration, and the filtrate was fractionally distilled under reduced pressure. The diacetate of 1,3-propanediol was recovered in a good overall yield. Excess reactants, largely excess acetic acid, also was recovered in a degree of purity suitable for reutilization, if desired, in a further execution of the process.

Example III 2-methyl-1,1,3-triacetoxypropane, prepared by reaction of methacrolein with acetic anhydride and subsequent reaction of the 2-methyl-1,1-diacetoxy-2-propene thus obtained with acetic acid, was reacted with hydrogen according to the method employed in Example I, the reaction being continued until the theoretically required amount of hydrogen had been absorbed. Upon removal of the catalyst and fractional distillation of the reaction mixture, the diacetate of 2-methyl-1,3-propanediol was recovered in good yield.

I claim as my invention:

1. The process for the preparation of 1,3-propanediol diacetate, comprising subjecting 1,1,3-triacetoxypropane at a temperature between about 75° C. and about 200° C. in the presence of Raney nickel catalyst to the action of hydrogen gas at a pressure between about 500 pounds per square inch and about 2500 pounds per square inch to produce principally 1,3-propanediol diacetate.

2. The process for the preparation of 2-methyl-1,3-propanediol diacetate, comprising subjecting 1,1,3-triacetoxy-2-methylpropane at a temperature between about 75° C. and about 200° C. in the presence of Raney nickel catalyst to the action of hydrogen gas at a pressure between about 500 pounds per square inch and about 2500 pounds per square inch to produce principally 2-methyl-1,3-propanediol diacetate.

3. The process for the preparation of 1,3-butanediol diacetate, comprising subjecting 1,1,3-triacetoxybutane at a temperature between about 75° C. and about 200° C. in the presence of Raney nickel catalyst to the action of hydrogen gas at a pressure between about 500 pounds per square inch and about 2500 pounds per square inch to produce principally 1,3-butanediol diacetate.

4. The process for the preparation of a diester of a 1,3-alkanediol with a saturated, lower aliphatic monocarboxylic acid, comprising subjecting a triester of a 1,1,3-alkanetriol with a saturated, lower aliphatic monocarboxylic acid at a temperature between about 50° C. and about 350° C. in the presence of a base metal hydrogenation catalyst to the action of hydrogen gas at a pressure between about 500 pounds per square inch and about 5000 pounds per square inch to produce principally the ester of the monocarboxylic acid with the 1,3-alkanediol containing the same number and arrangement of carbon atoms as said 1,1,3-alkanetriol.

CURTIS W. SMITH.

REFERENCES CITED

The following references are of record in the file of this patent:

UNITED STATES PATENTS

| Number | Name | Date |
|---|---|---|
| 2,065,540 | Schneider | Dec. 29, 1936 |
| 2,122,812 | Groll et al. | July 5, 1938 |
| 2,393,740 | Brant et al. | Jan. 29, 1946 |
| 2,400,727 | Yale | May 21, 1946 |